United States Patent
Nan et al.

(10) Patent No.: US 8,748,044 B2
(45) Date of Patent: Jun. 10, 2014

(54) LI-LA-TI-O COMPOSITE SOLID ELECTROLYTE MATERIAL CONTAINING SILICON AND SYNTHESIZING METHOD THEREOF

(75) Inventors: Cewen Nan, Beijing (CN); Ao Mei, Beijing (CN); Yuchuan Feng, Beijing (CN); Lin Yuanhua, Beijing (CN); Yoshitaka Minamida, Susono (JP); Shoji Yokoishi, Mishima (JP)

(73) Assignees: Toyota Jidosha Kabushiki Kaisha, Toyota-Shi (JP); Tsinghua University, Beijing (CN)

( * ) Notice: Subject to any disclaimer, the term of this patent is extended or adjusted under 35 U.S.C. 154(b) by 712 days.

(21) Appl. No.: 12/991,496

(22) PCT Filed: Jul. 24, 2009

(86) PCT No.: PCT/CN2009/072911
§ 371 (c)(1),
(2), (4) Date: Nov. 8, 2010

(87) PCT Pub. No.: WO2010/009680
PCT Pub. Date: Jan. 28, 2010

(65) Prior Publication Data
US 2011/0059369 A1    Mar. 10, 2011

(30) Foreign Application Priority Data
Jul. 25, 2008   (CN) .......................... 2008 1 0117183

(51) Int. Cl.
    *H01M 6/18*    (2006.01)
(52) U.S. Cl.
    USPC .......................................... 429/322; 429/317
(58) Field of Classification Search
    USPC ......... 429/322, 317, 246, 223, 219, 228, 242, 429/224
    See application file for complete search history.

(56) References Cited

U.S. PATENT DOCUMENTS 8,153,329 B2 *  4/2012  Suzuki et al. ................. 429/492
2007/0172739 A1 *  7/2007  Visco et al. .................... 429/322

FOREIGN PATENT DOCUMENTS

| CN | 1970455 A | 5/2007 |
|---|---|---|
| CN | 101325094 A | 12/2008 |

(Continued)

OTHER PUBLICATIONS

Suijun Shang, et al.: "Fabrication and Study On Property of Composite Inactive Phase Li0.5La0.5TiO3 Solid State Electrolyte", Journal of Functional Materials, 2007, vol. 38, pp. 554-556, ISSN 1001-9731.

*Primary Examiner* — Mark F Huff
*Assistant Examiner* — Monique Wills
(74) *Attorney, Agent, or Firm* — Kenyon & Kenyon LLP

(57) ABSTRACT

The invention relates to a lithium lanthanum titanate composite solid electrolyte material containing silicon in which amorphous Si or an amorphous Si compound exist in a grain boundary between crystal grains, and a method of producing the same, and belongs to a field of a lithium ion battery. According to the invention, the amorphous Si or the amorphous Si compound exist in the grain boundary between the crystal grains of the lithium lanthanum titanate. The amorphous Si or the amorphous Si compound are introduced into the grain boundary by employing a wet chemical method. In the wet chemical method, the inexpensive organosilicon compound is used as an additive, and the organosilicon compound is added into the lithium lanthanum titanate solid electrolyte material. Thus, it is possible to synthesize the lithium lanthanum titanate composite solid electrolyte material containing silicon by performing sintering when the ratio of mass of the Si or mass of the Si calculated based on mass of the Si compound to mass of the lithium lanthanum titanate is 0.27% to 1.35%.

13 Claims, 4 Drawing Sheets

(56) References Cited

FOREIGN PATENT DOCUMENTS

| JP | 09-219215 | A | 8/1997 |
|---|---|---|---|
| JP | 2001-283913 | A | 10/2001 |
| JP | 2008-059843 | A | 3/2008 |
| JP | 2008-130844 | A | 6/2008 |
| WO | 2007/075867 | A2 | 7/2007 |

* cited by examiner

US 8,748,044 B2

LI-LA-TI-O COMPOSITE SOLID ELECTROLYTE MATERIAL CONTAINING SILICON AND SYNTHESIZING METHOD THEREOF

This is a 371 national phase application of PCT/CN2009/072911 filed 24 Jul. 2009, claiming priority to Chinese Patent Application No. 2008-10117183.X filed 25 Jul. 2008, the contents of which are incorporated herein by reference.

BACKGROUND OF THE INVENTION

1. Field of the Invention

The invention belongs to a field of a lithium ion battery, and relates to a lithium lanthanum titanate composite solid electrolyte material containing silicon, which has high reliability, and which is used in a lithium ion battery, and a synthesizing method thereof.

2. Description of the Related Art

As the pressure for energy conservation and environmental protection increases, countries of the world have employed a strategy for development of automobile industry, and the strategy is to develop clean and high-efficient transportation means and to replace conventional vehicles, which use gasoline and light oil, with the transportation means, in order to reduce dependency on petroleum oil and to reduce environmental pollution. When developing a vehicle using new energy, higher-level requests regarding the storage of power/energy are made. A power battery needs to be smaller, lighter, and safer. A lithium ion battery is regarded as the optimum power battery to be used in a future vehicle using new energy, because the lithium ion battery has high operating voltage, high mass density, and high energy density, and thus, the lithium ion battery is superior to other secondary batteries.

In all concept cars using new energy that are currently being developed by major automobile manufacturers in the world, the lithium ion battery is used as the power battery. However, in vehicle models that are actually mass-produced, the lithium ion battery is seldom used. The advantage of this kind of electrolyte is that conductivity of the electrolyte is high. However, this kind of battery needs to be tightly sealed to ensure that the electrolyte in a liquid state does not leak. Because the battery needs to be tightly sealed, there is a limit on the decrease in the volume of the battery. In addition, because most of the electrolytes in a liquid state or a gel state are combustible organic substances, combustion may be caused in the battery under the condition that the electrolyte receives heat or a chemical reaction occurs between the electrolyte and an electrode.

However, a solid inorganic electrolyte can make up for the shortcoming of the electrolytes in the liquid state or the gel state. Therefore, persons skilled in the art are conducting research and development of the solid electrolyte on a massive scale. However, the largest barrier for practical use of the solid inorganic electrolyte is that conductivity of the solid inorganic electrolyte is extremely low, and much lower than conductivity required for commercial use (for example, conductivity reaching $10^{-3}$ S/cm).

Among many solid inorganic electrolytes that have been discovered by persons skilled in the art, a solid inorganic electrolyte whose conductivity is relatively near the level required for commercial use is a lithium lanthanum titanate (LLTO) compound. The chemical formula of LLTO is $Li_{3x}La_{2/3-x}TiO_3$ ($0<x<0.16$). Although the conductivity of the crystal grain thereof has already reached $10^{-3}$ S/cm, the grain boundary conductivity thereof is lower than $10^{-5}$ S/cm. This decreases the conductivity of LLTO. Therefore, LLTO does not meet the requirement for practical use. Improvement of the grain boundary conductivity is the most direct and effective method for improving the conductivity of the solid oxide conductor for lithium ions. This is a bottleneck issue when using the solid oxide electrolyte. The invention provides a lithium lanthanum titanate composite solid electrolyte material containing silicon, in which the conductivity of LLTO is effectively improved, and which is a promising material to be used in a high-efficient power lithium ion battery.

SUMMARY OF THE INVENTION

The invention provides a new lithium lanthanum titanate composite solid electrolyte material containing silicon and synthesizing method thereof. Inventors of the invention have found that in a LLTO composite solid electrolyte material containing silicon, when amorphous Si or an amorphous Si compound exists in a grain boundary between crystal grains of lithium lanthanum titanate, grain boundary conductivity thereof is significantly improved, and therefore, total conductivity is improved. Thus, the inventors have completed the invention.

That is, in an LLTO composite solid electrolyte material containing silicon according to the invention, amorphous Si or an amorphous Si compound exists in a grain boundary between crystal grains (1) of lithium lanthanum titanate whose chemical formula is $Li_{3x}La_{2/3-x}TiO_3$ ($0<x<0.16$). When the amorphous Si or the amorphous Si compound exists, the grain boundary conductivity is significantly improved, and therefore, the total conductivity is improved.

Also, it is preferable that a ratio of mass of the Si or mass of the Si calculated based on mass of the Si compound to mass of the lithium lanthanum titanate (LLTO) should be 0.27 to 1.35%. Thus, it is possible to reliably improve the grain boundary conductivity.

In the invention, the amorphous Si or the amorphous Si compound (2) is introduced to the grain boundary by employing a wet chemical method. In the wet chemical method, the inexpensive organosilicon compound is used as an additive, and the organosilicon compound is added into the lithium lanthanum titanate solid electrolyte material. Thus, it is possible to synthesize the lithium lanthanum titanate composite solid electrolyte material containing silicon, by performing sintering when the ratio of the mass of the silicon to the mass of the lithium lanthanum titanate is 0.27% to 1.35% (when the ratio of the mass of the Si calculated based on mass of an Si compound to the mass of the lithium lanthanum titanate is 0.27% to 1.35% if the silicon exists in the form of the Si compound). As the organosilicon compound, for example, tetraethoxysilane and/or tetramethoxysilane are/is used. However, the organosilicon compound is not limited to them.

Further, it is preferable that, in the lithium lanthanum titanate composite solid electrolyte material containing silicon according to the invention, the Si compound should contain Si compound includes an Si compound containing $SiO_2$ and/or an Li ion.

Also, in the invention, it is preferable that the Si or the Si compound should exist in the faun of a nano-height amorphous silicon layer. It has been found that when the Si or the Si compound exists in the form of the nano-height amorphous silicon layer, the grain boundary conductivity is significantly improved, and therefore, the total conductivity is improved.

Also, the invention provides a method of synthesizing an LLTO composite solid electrolyte material containing silicon. In the method, $Li_{3x}La_{2/3-x}TiO_3$ ($0<x<0.16$) is added to a silicon precursor solution to produce a mixture, the mixture is dried by heating, then the dried mixture is fanned into a pellet, and calcination is performed. Further, it is preferable that, in the above-described synthesize method according to the invention, the silicon precursor solution should be prepared so that a ratio of mass of Si calculated based on mass of the silicon precursor solution to mass of lithium lanthanum titanate is 0.27% to 1.35%. In the above method, sintering is performed at 1100 to 1400° C., preferably, sintering is performed at 1200 to 1400° C. The sintering is performed for 1 to 10 hours, preferably for 2 to 10 hours, more preferably for 2 to 8 hours. The heating temperature is at 50 to 250° C., preferably at 80 to 200° C., more preferably at 120 to 200° C. It is heated for 1 to 5 hours, preferably for 2 to 5 hours at the heating temperature.

Further, a process flow performed in the invention includes the following steps.
(1) preparing LLTO source material powder, wherein $Li_{3x}La_{2/3-x}TiO_3$ (0<x<0.16) is prepared using a solid phase method or a sol-gel method, and a suspension "a" is produced by dispersing the source material powder in ethanol;
(2) preparing a catalyst, wherein a mixed solution "b" is prepared by mixing water, ethanol, and ammonia water at a given volume ratio;
(3) preparing the silicon precursor solution, wherein an organosilicon compound is measured out, and a solution "c" is produced by dispersing the organosilicon compound in ethanol;
(4) preparing a mixed liquid, wherein after the suspension "a" is mixed with the mixed solution "b" to prepare the mixed liquid, the solution "c" is dropped into the mixed liquid, and then, the mixed liquid is uniformly agitated;
(5) causing a thermal reaction, wherein the mixed liquid, which has been agitated, is heated at 50 to 250° C. for 1 to 5 hours;
(6) performing drying, wherein composite powder is produced by performing drying at 10 to 100° C.; and
(7) performing sintering, wherein a composite solid electrolyte material is produced by pressing the composite powder to farm a sheet, and then, performing sintering at a high temperature of 1100 to 1400° C. for 1 to 10 hours.

As the organosilicon compound used in the above step (3), for example, tetraethoxysilane and/or tetramethoxysilane may be used. However, the organosilicon compound is not limited to them.

By performing measurement on the solid electrolyte material produced according to the above-described method by electrochemical impedance spectroscopy, it is possible to find that the grain boundary conductivity is obviously improved. At this time, by determining the characteristics of the solid electrolyte material by energy dispersive X-ray spectroscopic analysis (EDX) and a transmission electron microscope (TEM), it is possible to find that the silicon exists in the grain boundary. Also, by performing observation by X-ray diffraction (XRD) and the transmission electron microscope (TEM), it is possible to confirm that the silicon, which exists in the grain boundary, is amorphous.

The advantageous effects of the invention are as follows. That is, as compared to other solid electrolytes whose conductivity is improved by increasing a sintering temperature, and other experimental methods in which the conductivity of the solid electrolyte is improved by increasing the sintering temperature, the conductivity of the LLTO composite solid electrolyte material according to the invention is obviously improved. Also, the processes of the experimental method according to the invention are simple, and easily performed. Also, an experimental period is greatly reduced, a synthesis temperature is reduced, and energy consumption and production cost are reduced.

DETAILED DESCRIPTION OF EMBODIMENTS

Figure 1:
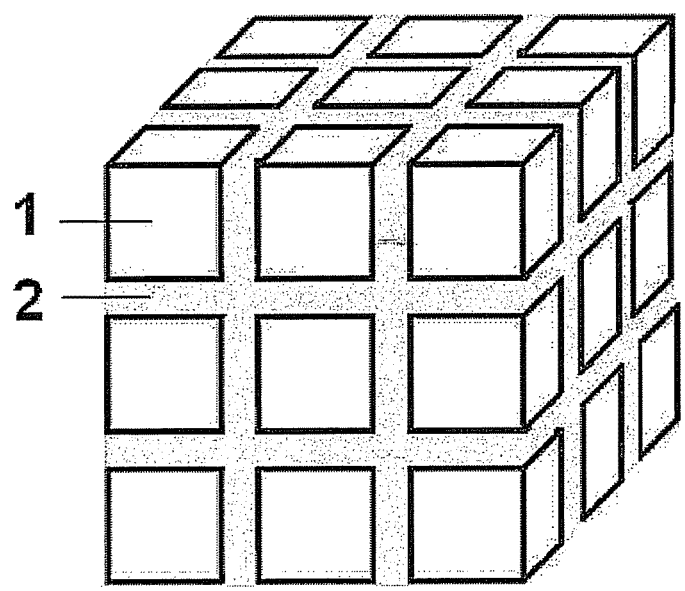
FIG. 1 is a schematic diagram showing an LLTO composite solid electrolyte material according to the invention.
Figure 2:
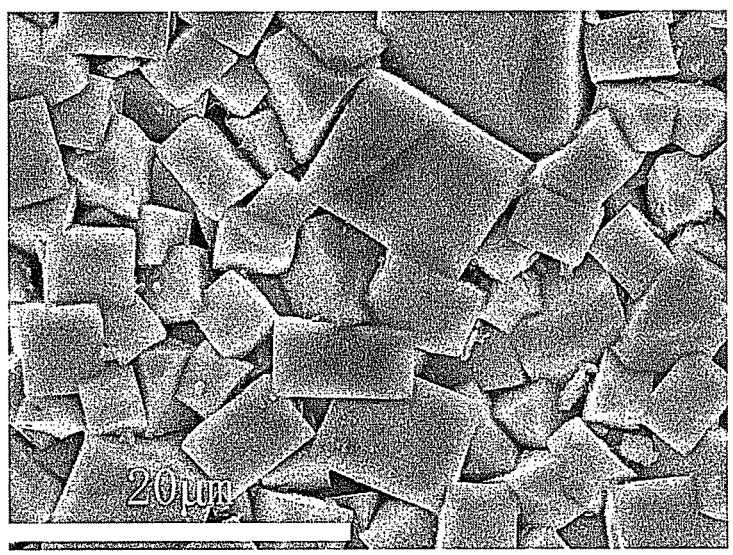
FIG. 2 is a scanning electron microscopic photo showing a surface of a sintered sample according to the invention.

The invention provides a lithium lanthanum titanate (LLTO) composite solid electrolyte material containing silicon, and a synthesizing method thereof. As shown in FIG. 1, the invention is characterized mainly in that amorphous Si or an amorphous Si compound 2 exists in a grain boundary between crystal grains 1 of lithium lanthanum titanate ($Li_{3x}La_{2/3-x}TiO_3$ (0<x<0.16)). When the amorphous Si or the amorphous Si compound exists, grain boundary conductivity is significantly improved, and therefore, total conductivity is improved. It is preferable that the ratio of mass of the Si or mass of the Si calculated based on mass of the Si compound to mass of the lithium lanthanum titanate should be 0.27% to 1.35%. Thus, it is possible to reliably improve the grain boundary conductivity.

In the invention, the amorphous Si or the amorphous Si compound 2 is introduced to the grain boundary by employing a wet chemical method. In the wet chemical method, the inexpensive organosilicon compound is used as an additive, and the organosilicon compound is added into the lithium lanthanum titanate solid electrolyte material. Thus, it is possible to synthesize the LLTO composite solid electrolyte material containing silicon, by performing sintering when the ratio of the mass of the silicon to the mass of the lithium lanthanum titanate is 0.27% to 1.35%. As the organosilicon compound, for example, tetraethoxysilane and/or tetramethoxysilane are/is used. However, the organosilicon compound is not limited to them.

Further, it is preferable that, in the LLTO composite solid electrolyte material containing silicon, the Si compound should contain $SiO_2$, and/or the Si compound should further include Si compound contain an Li ion.

Also, in the invention, it is preferable that the Si or Si compound should exist in the form of a nano-height amorphous silicon layer. It has been found that when the Si or Si compound exists in the form of the nano-height amorphous silicon layer, the grain boundary conductivity is significantly improved, and therefore, the total conductivity is improved.

In a method of synthesizing the lithium lanthanum titanate composite solid electrolyte material containing silicon according to the invention, $Li_{3x}La_{2/3-x}TiO_3$ (0<x<0.16) is added to a silicon precursor solution to produce a mixture, the mixture is dried by heating, then the dried mixture is formed into a pellet, and calcination is performed. Further, it is preferable that, in the above-described synthesize method according to the invention, the silicon precursor solution should be prepared so that the ratio of mass of Si calculated based on mass of the silicon precursor solution to mass of the lithium lanthanum titanate is 0.27% to 1.35%.

Further, the process flow performed in the invention includes the following steps.

(1) Preparation of LLTO Source Material Powder $Li_{3x}La_{2/3-x}TiO_3$ (0<x<0.16) is prepared using a solid phase method or a sol-gel method. A suspension "a" is produced to be used, by dispersing source material powder in ethanol.

(2) Preparation of a Catalyst

A mixed solution "b" is prepared by mixing water, ethanol, and ammonia water at a given volume ratio.

(3) Preparation of the Silicon Precursor Solution

An organosilicon compound (for example, tetraethoxysilane and/or tetramethoxysilane) is measured out, and a solution "c" is produced by dispersing the organosilicon compound in ethanol.

(4) Preparation of a Mixed Liquid

After the suspension "a" is mixed with the mixed solution "b" to prepare a mixed liquid, the solution "c" is dropped into the mixed liquid, and then, the mixed liquid is uniformly agitated.

(5) Thermal Reaction

The mixed liquid, which has been agitated, is heated at 50 to 250° C. for 1 to 5 hours.

(6) Drying

Composite powder is produced by performing drying at 10 to 100° C.

(7) Sintering

A composite solid electrolyte material is produced by pressing the composite powder to form a sheet, and then, performing sintering at a high temperature of 1100 to 1400° C. for 1 to 10 hours.

As the organosilicon compound used in the above step (3), for example, tetraethoxysilane and/or tetramethoxysilane are/is used. However, the organosilicon is not limited to them.

Hereinafter, the invention will be further described with reference to examples in which the amount of the added Si varies, and a comparative example in which the Si is not added.

1. First Embodiment embodiment in which tetraethoxysilane is used as the organosilicon, and the content of the Si is changed.

First Comparative Example (1) Preparation of LLTO Source Material Powder $Li_{0.35}La_{0.55}TiO_3$ is prepared to be used, using the solid phase method or the sol-gel method.

(2) Sintering

A composite solid electrolyte material is produced by pressing powder to form a sheet, and then, performing sintering at a high temperature of 1400° C. for 2 hours.

It has been continued that silicon does not exist in the grain boundary, by determining the characteristics of the solid electrolyte material produced according to the above-described method, by energy dispersive X-ray spectroscopic analysis (EDX) and a transmission electron microscope (IEM). When measurement on the electrolyte material is performed by electrochemical impedance spectroscopy, the total conductivity reaches $0.33 \times 10^{-4}$ S/cm, and the grain boundary conductivity reaches $0.34 \times 10^{-4}$ S/cm.

First Example (1) Preparation of the LLTO Source Material Powder $Li_{0.47}La_{0.51}TiO_3$ is prepared using the solid phase method or the sol-gel method. The suspension "a" is produced to be used, by dispersing 10 g of the source material powder in ethanol.

(2) Preparation of the Catalyst

The mixed solution "b" is prepared by mixing 80 ml of water, 320 ml of ethanol, and 800 ml of ammonia water.

(3) Preparation of the Silicon Precursor Solution 0.2 g of tetraethoxysilane is measured out, and the solution "c" is produced by 0.2 g of tetraethoxysilane in ethanol.

(4) Preparation of the Mixed Liquid

After the suspension "a" is mixed with the mixed solution "b" to prepare the mixed liquid, the solution "c" is dropped into the mixed liquid, and then, the mixed liquid is uniformly agitated.

(5) Thermal Reaction

The mixed liquid, which has been agitated, is heated at 250° C. for 3 hours.

(6) Drying

The composite powder is produced by performing drying at 100° C.

(7) Sintering

The composite solid electrolyte material is produced by pressing the composite powder to form a sheet, and then, performing sintering at a high temperature of 1100° C. for 10 hours.

It has been confirmed that silicon exists in the grain boundary, by determining the characteristics of the solid electrolyte material produced according to the above-described method, by the energy dispersive X-ray spectroscopic analysis (EDX) and the transmission electron microscope (TEM). Also, it has been confirmed that the silicon, which exists in the grain boundary, is amorphous by performing observation by X-ray diffraction (XRD) and the transmission electron microscope (TEM). The ratio of the mass of the Si to the mass of the lithium lanthanum titanate is 0.27%. Further, when measurement on the produced solid electrolyte material is performed by electrochemical impedance spectroscopy, the total conductivity reaches $0.40 \times 10^{-4}$ S/cm, and the grain boundary conductivity reaches $0.42 \times 10^{-4}$ S/cm.

Second Example

(1) Preparation of the LLTO Source Material Powder $Li_{0.47}La_{0.51}TiO_3$ is prepared using the solid phase method or the sol-gel method. The suspension "a" is produced to be used, by dispersing 10 g of the source material powder in ethanol.

(2) Preparation of the Catalyst

The mixed solution "b" is prepared by mixing 80 ml of water, 240 ml of ethanol, and 400 ml of ammonia water.

(3) Preparation of the Silicon Precursor Solution 0.5 g of tetraethoxysilane is measured out, and the solution "c" is produced by dispersing 0.5 g of tetraethoxysilane in ethanol.

(4) Preparation of the Mixed Liquid

After the suspension "a" is mixed with the mixed solution "b" to prepare the mixed liquid, the solution "c" is dropped into the mixed liquid, and then, the mixed liquid is uniformly agitated.

(5) Thermal Reaction

The mixed liquid, which has been agitated, is heated at 200° C. for 1 hour.

(6) Drying

The composite powder is produced by performing drying at 90° C.

(7) Sintering

The composite solid electrolyte material is produced by pressing the composite powder to form a sheet, and then, performing sintering at a high temperature of 1200° C. for 8 hours.

It has been confirmed that the silicon exists in the grain boundary, by determining the characteristics of the composite solid electrolyte material produced according to the above-described method, by the energy dispersive X-ray spectroscopic analysis (EDX) and the transmission electron microscope (TEM). Also, it has been confirmed that the silicon, which exists in the grain boundary, is amorphous by performing observation by the X-ray diffraction (XRD) and the transmission electron microscope (TEM). The ratio of the mass of the Si to the mass of the lithium lanthanum titanate is 0.67%. Further, when measurement on the produced solid electrolyte material is performed by the electrochemical impedance spectroscopy, the total conductivity reaches $0.76 \times 10^{-4}$ S/cm, and the grain boundary conductivity reaches $1.14 \times 10^{-4}$ S/cm.

Third Example

(1) Preparation of the LLTO source material powder $Li_{0.35}La_{0.55}TiO_3$ is prepared using the solid phase method or the sol-gel method. The suspension "a" is produced to be used, by dispersing 10 g of the source material powder in ethanol.

(2) Preparation of the Catalyst

The mixed solution "b" is prepared by mixing 20 ml of water, 80 ml of ethanol, and 160 ml of ammonia water.

(3) Preparation of the Silicon Precursor Solution 0.8 g of tetraethoxysilane is measured out, and the solution "c" is produced by dispersing 0.8 g of tetraethoxysilane in ethanol.

(4) Preparation of the Mixed Liquid

After the suspension "a" is mixed with the mixed solution "b" to prepare the mixed liquid, the solution "c" is dropped into the mixed liquid, and then, the mixed liquid is uniformly agitated.

(5) Thermal Reaction

The mixed liquid, which has been agitated, is heated at 120° C. for 2 hours.

(6) Drying

The composite powder is produced by performing drying at 60° C.

(7) Sintering

The composite solid electrolyte material is produced by pressing the composite powder to form a sheet, and then, performing sintering at a high temperature of 1350° C. for 6 hours.

It has been confirmed that the silicon exists in the grain boundary, by determining the characteristics of the composite solid electrolyte material produced according to the above-described method, by the energy dispersive X-ray spectroscopic analysis (EDX) and the transmission electron microscope (TEM). Also, it has been continued that the silicon, which exists in the grain boundary, is amorphous by performing observation by the X-ray diffraction (XRD) and the transmission electron microscope (TEM). The ratio of the mass of the Si to the mass of the lithium lanthanum titanate is 1.08%. Further, when measurement on the produced solid electrolyte material is performed by the electrochemical impedance spectroscopy, the total conductivity reaches $0.89 \times 10^{-4}$ S/cm, and the grain boundary conductivity reaches $1.32 \times 10^{-4}$ S/cm.

Forth Example

(1) Preparation of the LLTO Source Material Powder $Li_{0.35}La_{0.55}TiO_3$ is prepared using the solid phase method or the sol-gel method. The suspension "a" is produced to be used, by dispersing 10 g of the source material powder in ethanol.

(2) Preparation of the Catalyst

The mixed solution "b" is prepared by mixing 10 ml of water, 60 ml of ethanol, and 50 ml of ammonia water.

(3) Preparation of the Silicon Precursor Solution 1 g of tetraethoxysilane is measured out, and the solution "c" is produced by dispersing 1 g of tetraethoxysilane in ethanol.

(4) Preparation of the Mixed Liquid

After the suspension "a" is mixed with the mixed solution "b" to prepare the mixed liquid, the solution "c" is dropped into the mixed liquid, and then, the mixed liquid is uniformly agitated.

(5) Thermal reaction

The mixed liquid, which has been agitated, is heated at 80° C. for 5 hours.

(6) Drying

The composite powder is produced by performing drying at 30° C.

(7) Sintering

The composite solid electrolyte material is produced by pressing the composite powder to form a sheet, and then, performing sintering at a high temperature of 1400° C. for 2 hours.

It has been confirmed that the silicon exists in the grain boundary, by determining the characteristics of the composite solid electrolyte material produced according to the above-described method, by the energy dispersive X-ray spectroscopic analysis (EDX) and the transmission electron microscope (TEM). Also, it has been confirmed that the silicon, which exists in the grain boundary, is amorphous by performing observation by the X-ray diffraction (XRD) and the transmission electron microscope (TEM). The ratio of the mass of the Si to the mass of the lithium lanthanum titanate is 1.35%. Further, when measurement on the produced solid electrolyte material is performed by the electrochemical impedance spectroscopy, the total conductivity reaches 0.59×5 cm, and the grain boundary conductivity reaches $0.78 \times 10^{-4}$ S/cm.

The method for confirming that the amorphous silicon exists in the grain boundary between the crystal grains will be described with reference to the following example.

1) First, the sample of the composite solid electrolyte material (the ratio of the mass of the Si to the mass of the lithium lanthanum titanate is 1.08%), which is produced in the third example, is used as an example. It is found that a substance with a different composition exists in the grain boundary, based on a high-angle-annular-dark-field image (HAADF) of the sample shown in FIG. 3, which is obtained by a scanning transmission electron microscope (STEM).

Figure 3:
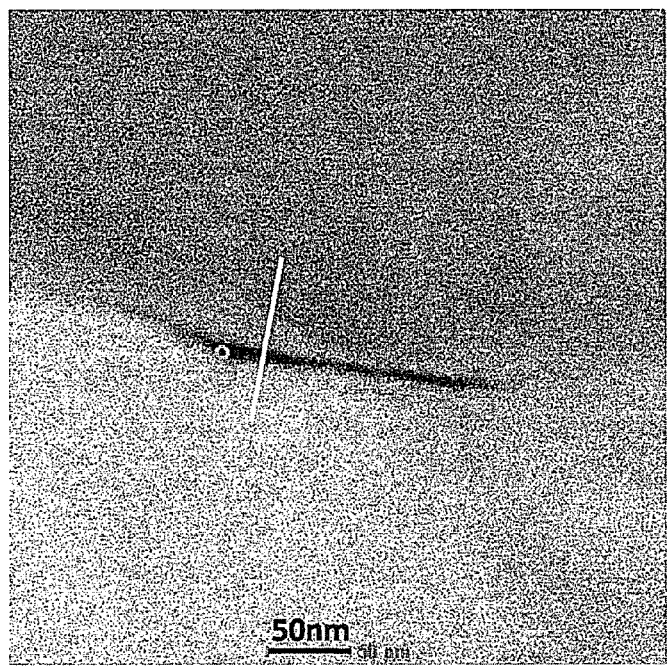
FIG. 3 is a diagram showing a high-angle-annular-dark-field image (HAADF) of the sintered sample according to the invention, which is obtained by a scanning transmission electron microscope (STEM)
Figure 4:
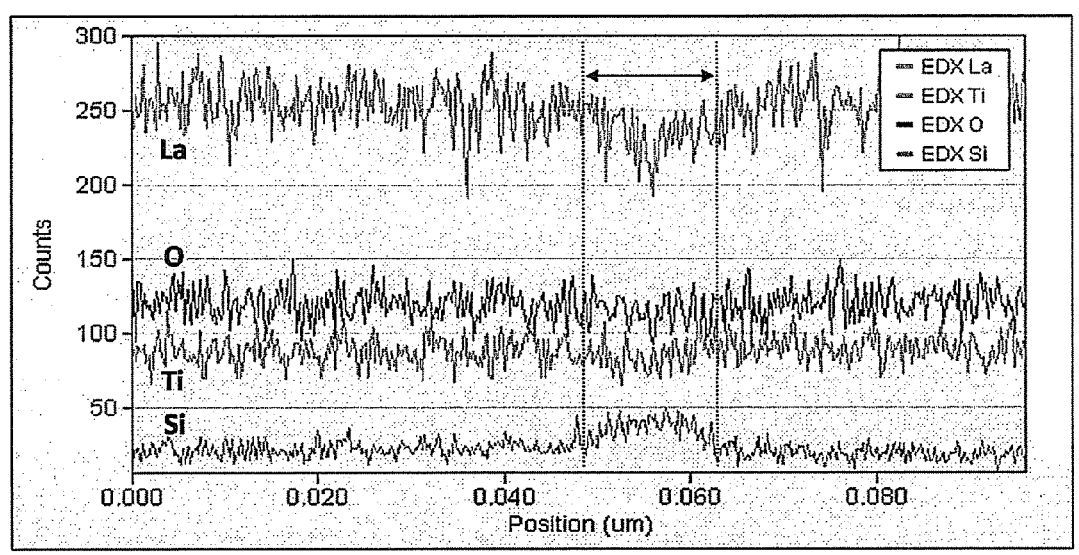
FIG. 4 shows the result of energy dispersive X-ray spectroscopic analysis (EDX) on a straight line region in FIG. 3.

2) Next, by performing the energy dispersive X-ray spectroscopic analysis (EDX) on a straight line region in FIG. 3, it has been determined that the silicon exists in the scanned grain boundary region (refer to FIG. 4).

Thus, it has been confirmed that the Si exists in the grain boundary of the produced composite solid electrolyte material.

Figure 5:
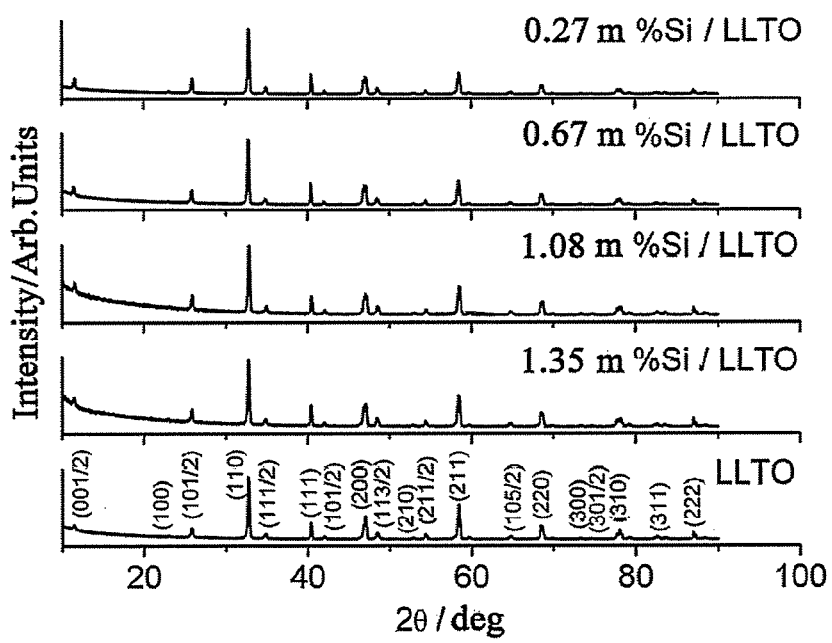
FIG. 5 is an X-ray diffraction diagram of the sintered sample according to the invention.

3) Further, by performing the X-ray diffraction (XRD) on the composite solid electrolyte materials produced in the above-described comparison example and the first to fourth examples, it has been proved that the silicon exists in the form of the amorphous silicon, because a diffraction peak of the Si compound has not been detected, as shown in the X-ray diffraction diagram in FIG. 5.

Figure 6:
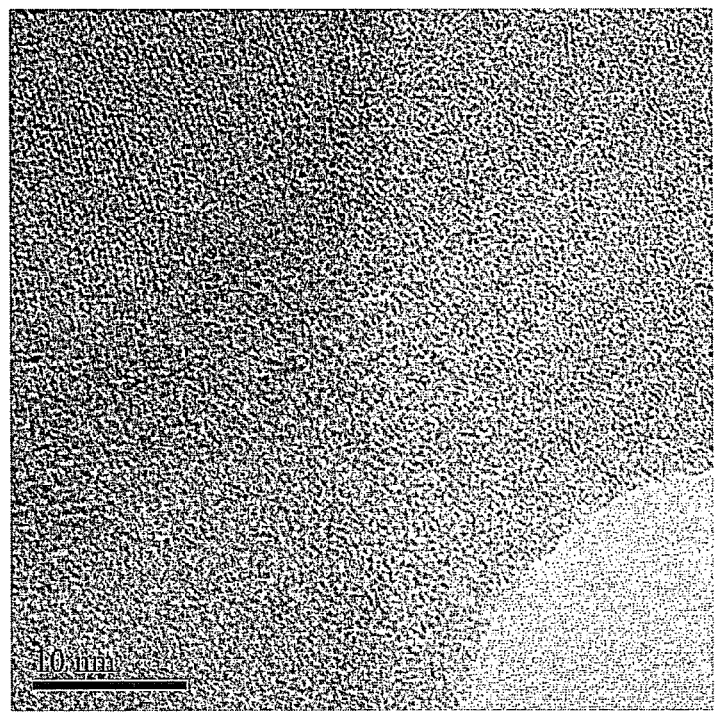
FIG. 6 is a diagram showing the sintered sample according to the invention, which is observed by a transmission electron microscope (TEM)

4) Further, by observing the sample of the composite solid electrolyte material (Si/LLTO is 1.08 mass %) produced in the third example using the transmission electron microscope (TEM), it has been confirmed that an amorphous material exists in the grain boundary region, as shown in FIG. 6.

As evident from the above-described detection, the amorphous Si exists in the grain boundary between the crystal grains of the lithium lanthanum titanate according to the invention.

Figure 7:
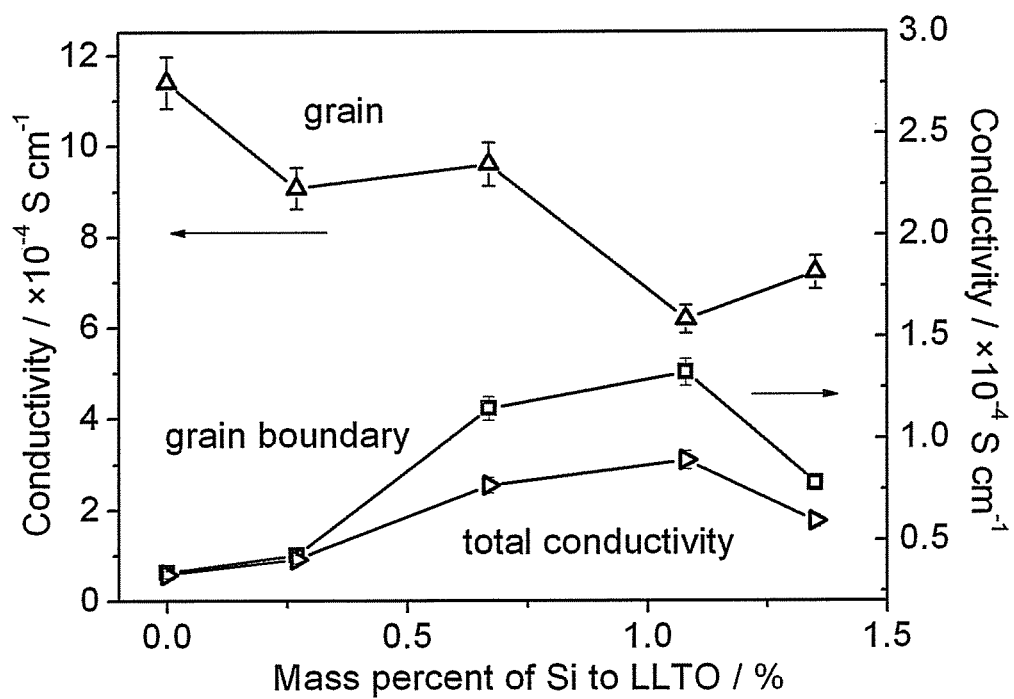
FIG. 7 shows changes in conductivity of the LLTO composite solid electrolyte according to the invention at room temperature when the content of silicon varies.

Also, based on the composite solid electrolyte materials produced in the above-described comparative example and the first to fourth examples, a diagram showing relation between the content of the Si and conductivity (that is, a diagram in which the conductivity of the composite solid electrolyte material at room temperature is changed according to the content of the Si) has been made, as shown in FIG. 7. As evident from FIG. 7, and the above-described comparative example and the examples, when the Si is not contained, the grain boundary conductivity is as low as $0.34 \times 10^{-4}$ S/cm, and the total conductivity is as low as $0.33 \times 10^{-4}$ S/cm. When the content of the Si is 0.27 mass % (i.e., Si/LLTO. Hereinafter, the mass percent signifies Si/LLTO), the grain boundary conductivity is $0.42 \times 10^{-4}$ S/cm, and the total conductivity is $0.40 \times 10^{-4}$ S/cm. As the content of the Si is increased, both of the grain boundary conductivity and the total conductivity are significantly improved. When the content of the Si reaches 1.08 mass %, the grain boundary conductivity reaches a peak value of $1.32 \times 10^{-4}$ S/cm, and the total conductivity reaches a peak value of $0.89 \times 10^{-4}$ S/cm. When the content of the Si is further increased to 1.35 mass %, the grain boundary conductivity is decreased to $0.78 \times 10^{-4}$ S/cm, and the total conductivity is decreased to $0.59 \times 10^{-4}$ S/cm. However, the grain boundary conductivity and the total conductivity are obviously improved, as compared to when the Si is not contained. As described above, the total conductivity of the LLTO composite solid electrolyte material is obviously improved when the content of the Si is in a range of 0.27 to 1.35 mass %.

2. Second Embodiment embodiment in which tetramethoxysilane is used as the organosilicon compound, and the content of Si is changed.

In the above-described embodiment, it has been described that tetraethoxysilane is used as the organosilicon compound. Hereinafter, the case where tetramethoxysilane is used as the organosilicon compound will be described.

Second Comparative Example

(1) Preparation of LLTO Source Material Powder $Li_{0.15}La_{0.61}TiO_3$ is prepared to be used, using the solid phase method or the sol-gel method.

(2) Sintering

A composite solid electrolyte material is produced by pressing powder to form a sheet, and then, performing sintering at a high temperature of 1400° C. for 2 hours.

It has been confirmed that the silicon does not exist in the grain boundary, by determining the characteristics of the solid electrolyte material produced according to the above-described method, by the energy dispersive X-ray spectroscopic analysis (EDX) and the transmission electron microscope (TEM). When measurement on the electrolyte material is performed by the electrochemical impedance spectroscopy, the total conductivity reaches $0.33 \times 10^{-4}$ S/cm, and the grain boundary conductivity reaches $0.34 \times 10^{-4}$ S/cm.

Fifth Example (1) Preparation of the LLTO Source Material Powder $Li_{0.15}La_{0.61}TiO_3$ is prepared using the solid phase method or the sol-gel method. The suspension "a" is produced to be used, by dispersing 10 g of the source material powder in ethanol.

(2) Preparation of the Catalyst

The mixed solution "b" is prepared by mixing 80 ml of water, 320 ml of ethanol, and 800 ml of ammonia water.

(3) Preparation of the Silicon Precursor Solution 0.085 g of tetramethoxysilane is measured out, and the solution "c" is produced by dispersing 0.085 g of tetramethoxysilane in ethanol.

(4) Preparation of the Mixed Liquid

After the suspension "a" is mixed with the mixed solution "b" to prepare the mixed liquid, the solution "c" is dropped into the mixed liquid, and then, the mixed liquid is uniformly agitated.

(5) Thermal Reaction

The mixed liquid, which has been agitated, is heated at 250° C. for 3 hours.

(6) Drying

The composite powder is produced by performing drying at 100° C.

(7) Sintering

The composite solid electrolyte material is produced by pressing the composite powder to form a sheet, and then, performing sintering at a high temperature of 1100° C. for 10 hours.

It has been confirmed that the silicon exists in the grain boundary, by determining the characteristics of the composite solid electrolyte material produced according to the above-described method, by the energy dispersive X-ray spectroscopic analysis (EDX) and the transmission electron microscope (TEM). Also, it has been confirmed that the silicon, which exists in the grain boundary, is amorphous by performing observation by the X-ray diffraction (XRD) and the transmission electron microscope (TEM). The ratio of the mass of the Si to the mass of the lithium lanthanum titanate is 0.27%. Further, when measurement on the produced solid electrolyte material is performed by the electrochemical impedance spectroscopy, the total conductivity reaches $0.40 \times 10^{-4}$ S/cm, and the grain boundary conductivity reaches $0.42 \times 10^{-4}$ S/cm.

Sixth Example (1) Preparation of the LLTO Source Material Powder $Li_{0.06}La_{0.65}TiO_3$ is prepared using the solid phase method or the sol-gel method. The suspension "a" is produced to be used, by dispersing 10 g of the source material powder in ethanol.

(2) Preparation of the Catalyst

The mixed solution "b" is prepared by mixing 80 ml of water, 240 ml of ethanol, and 400 ml of ammonia water.

(3) Preparation of the Silicon Precursor Solution 0.212 g of tetramethoxysilane is measured out, and the solution "c" is produced by 0.212 g of tetramethoxysilane in ethanol.

(4) Preparation of the Mixed Liquid

After the suspension "a" is mixed with the mixed solution "b" to prepare the mixed liquid, the solution "c" is dropped into the mixed liquid, and then, the mixed liquid is uniformly agitated.

(5) Thermal Reaction

The mixed liquid, which has been agitated, is heated at 200° C. for 1 hour.

(6) Drying

The composite powder is produced by performing drying at 90° C.

(7) Sintering

The composite solid electrolyte material is produced by pressing the composite powder to form a sheet, and then, performing sintering at a high temperature of 1200° C. for 8 hours.

It has been confirmed that the silicon exists in the grain boundary, by determining the characteristics of the composite solid electrolyte material produced according to the above-described method, by the energy dispersive X-ray spectroscopic analysis (EDX) and the transmission electron microscope (TEM). Also, it has been confirmed that the silicon, which exists in the grain boundary, is amorphous by performing observation by the X-ray diffraction (XRD) and the transmission electron microscope (TEM). The ratio of the mass of the Si to the mass of the lithium lanthanum titanate is 0.67%. Further, when measurement on the produced solid electrolyte material is performed by the electrochemical impedance spectroscopy, the total conductivity reaches $0.76 \times 10^{-4}$ S/cm, and the grain boundary conductivity reaches $1.14 \times 10^{-4}$ S/cm.

Seventh Example (1) Preparation of the LLTO Source Material Powder $Li_{0.45}La_{0.51}TiO_3$ is prepared using the solid phase method or the sol-gel method. The suspension "a" is produced to be used, by dispersing 10 g of the source material powder in ethanol.

(2) Preparation of the Catalyst

The mixed solution "b" is prepared by mixing 20 ml of water, 80 ml of ethanol, and 160 ml of ammonia water.

(3) Preparation of the Silicon Precursor Solution 0.339 g of tetramethoxysilane is measured out, and the solution "c" is produced by 0.339 g of tetramethoxysilane in ethanol.

(4) Preparation of the Mixed Liquid

After the suspension "a" is mixed with the mixed solution "b" to prepare the mixed liquid, the solution "c" is dropped into the mixed liquid, and then, the mixed liquid is uniformly agitated.

(5) Thermal Reaction

The mixed liquid, which has been agitated, is heated at 120° C. for 2 hours.

(6) Drying

The composite powder is produced by performing drying at 60° C.

(7) Sintering

The composite solid electrolyte material is produced by pressing the composite powder to form a sheet, and then, performing sintering at a high temperature of 1350° C. for 6 hours.

It has been confirmed that the silicon exists in the grain boundary, by determining the characteristics of the composite solid electrolyte material produced according to the above-described method, by the energy dispersive X-ray spectroscopic analysis (EDX) and the transmission electron microscope (TEM). Also, it has been confirmed that the silicon, which exists in the grain boundary, is amorphous by performing observation by the X-ray diffraction (XRD) and the transmission electron microscope (TEM). The ratio of the mass of the Si to the mass of the lithium lanthanum titanate is 1.08%. Further, when measurement on the solid electrolyte material is performed by the electrochemical impedance spectroscopy, the total conductivity reaches 0.89 S/cm, and the grain boundary conductivity reaches $1.32 \times 10^{-4}$ S/cm.

Eighth Example

(1) Preparation of the LLTO Source Material Powder $Li_{0.3}La_{0.56}TiO_3$ is prepared using the solid phase method or the sol-gel method. The suspension "a" is produced to be used, by dispersing 10 g of the source material powder in ethanol.

(2) Preparation of the Catalyst

The mixed solution "b" is prepared by mixing 10 ml of water, 60 ml of ethanol, and 50 ml of ammonia water.

(3) Preparation of the Silicon Precursor Solution 0.424 g of tetramethoxysilane is measured out, and the solution "c" is produced by 0.424 g of tetramethoxysilane in ethanol.

(4) Preparation of the Mixed Liquid

After the suspension "a" is mixed with the mixed solution "b" to prepare the mixed liquid, the solution "c" is dropped into the mixed liquid, and then, the mixed liquid is uniformly agitated.

(5) Thermal Reaction

The mixed liquid, which has been agitated, is heated at 80° C. for 5 hours.

(6) Drying

The composite powder is produced by performing drying at 30° C.

(7) Sintering

The composite solid electrolyte material is produced by pressing the composite powder to form a sheet, and then, performing sintering at a high temperature of 1400° C. for 2 hours.

It has been continued that the silicon exists in the grain boundary, by determining the characteristics of the composite solid electrolyte material produced according to the above-described method, by the energy dispersive X-ray spectroscopic analysis (EDX) and the transmission electron microscope (TEM). Also, it has been continued that the silicon, which exists in the grain boundary, is amorphous by performing observation by the X-ray diffraction (XRD) and the transmission electron microscope (TEM). The ratio of the mass of the Si to the mass of the lithium lanthanum titanate is 1.35%. Further, when measurement on the produced solid electrolyte material is performed by the electrochemical impedance spectroscopy, the total conductivity reaches 0.59 S/cm, and the grain boundary conductivity reaches $0.78 \times 10^{-4}$ S/cm.

As described above, by performing measurement on the composite solid electrolyte materials synthesized in the above-described fifth to eighth examples using the same method as the method for continuing that the amorphous silicon exists in the grain boundary between the crystal grains in the above-described first embodiment, the same result as that obtained in the first embodiment is obtained. That is, it is confirmed that the amorphous silicon exists in the grain boundary between the crystal grains of the produced composite solid electrolyte material.

As evident from the comparison between the fifth to eighth examples with the second comparative example in the second embodiment, all the solid electrolyte materials, in which the amorphous Si (or the amorphous Si compound) exists in the grain boundary, exhibit relatively high conductivity, as in the first embodiment. This is because the amorphous Si or the amorphous Si compound that exists in the grain boundary improves the function of transferring electrons between the crystal grains. Thus, it is possible to solve the conventional problem that the grain boundary conductivity, which has the largest influence on the total conductivity, is low. Accordingly, it is possible to apply the solid electrolyte material to the lithium battery more widely. Further, in the second embodiment in which tetramethoxysilane is used as the organosilicon compound, when the content of the Si is in the range of 0.27 to 1.35 mass %, the total conductivity of the composite solid electrolyte material has been significantly improved, as in the first embodiment.

What is claimed is:

1. A lithium lanthanum titanate composite solid electrolyte material containing silicon, comprising:
   crystal grains of lithium lanthanum titanate whose chemical formula is $Li_{3x}La_{2/3-x}TiO_3$ (0<x<0.16), wherein each crystal grain contains multiple physical boundaries; and
   amorphous Si or an amorphous Si compound contained within the multiple physical boundaries of each crystal grain, wherein the amorphous Si or the amorphous Si compound contain Li ion that exists in a grain boundary between the crystal grains of lithium lanthanum titanate.

2. The lithium lanthanum titanate composite solid electrolyte material containing silicon according to claim 1, wherein a ratio of mass of the Si or mass of the Si calculated based on mass of the Si compound to mass of the lithium lanthanum titanate is 0.27 to 1.35%.

3. The lithium lanthanum titanate composite solid electrolyte material containing silicon according to claim 1, wherein the Si or the Si compound exists in a form of a nano-height amorphous silicon layer.

4. A method of synthesizing a lithium lanthanum titanate composite solid electrolyte material containing silicon, comprising:
   adding $Li_{3x}La_{2/3-x}TiO_3$ (0<x<0.16) to a silicon precursor solution to produce a mixture;
   drying the mixture by heating; and
   forming the dried mixture into a pellet, and performing sintering.

5. The method according to claim 4, wherein
   the silicon precursor solution is prepared so that a ratio of mass of Si calculated based on mass of the silicon precursor solution to mass of lithium lanthanum titanate is 0.27% to 1.35%.

6. The method according to claim 4, wherein sintering is performed at 1100 to 1400° C.

7. The method according to claim 6, wherein sintering is performed at 1200 to 1400° C.

8. The method according to claim 4, wherein sintering is performed for 1 to 10 hours.

9. The method according to claim 8, wherein sintering is performed for 2 to 10 hours.

10. The method according to claim 9, wherein sintering is performed for 2 to 8 hours.

11. The method according to claim 4, comprising:
    (1) preparing LLTO source material powder, wherein $Li_{3x}La_{2/3-x}TiO_3$ (0<x<0.16) is prepared using a solid phase method or a sol-gel method, and a suspension "a" is produced by dispersing the source material powder in ethanol;
    (2) preparing a catalyst, wherein a mixed solution "b" is prepared by mixing water, ethanol, and ammonia water at a given volume ratio;
    (3) preparing the silicon precursor solution, wherein an organosilicon compound is measured out, and a solution "c" is produced by dispersing the organosilicon compound in ethanol;
    (4) preparing a mixed liquid, wherein after the suspension "a" is mixed with the mixed solution "b" to prepare the mixed liquid, the solution "c" is dropped into the mixed liquid, and then, the mixed liquid is uniformly agitated;
    (5) causing a thermal reaction, wherein the mixed liquid, which has been agitated, is heated at 50 to 250° C. for 1 to 5 hours;
    (6) performing drying, wherein composite powder is produced by performing drying at 10 to 100° C.; and
    (7) performing sintering, wherein a composite solid electrolyte material is produced by pressing the composite powder to form a sheet, and then, performing sintering at a high temperature of 1100 to 1400° C. for 1 to 10 hours.

12. The method according to claim 11, wherein
in preparing the silicon precursor solution, the organosilicon compound, which is measured out, is at least one of tetraethoxysilane and tetramethoxysilane.

13. The method according to claim 11, wherein
in preparing the catalyst, the mixed solution "b" is prepared by mixing water, ethanol, and ammonia water at a ratio in a range of 1:2:2 to 1:4:10.

* * * * *

UNITED STATES PATENT AND TRADEMARK OFFICE
CERTIFICATE OF CORRECTION

| | |
|---|---|
| PATENT NO. | : 8,748,044 B2 |
| APPLICATION NO. | : 12/991496 |
| DATED | : June 10, 2014 |
| INVENTOR(S) | : Cewen Nan et al. |

It is certified that error appears in the above-identified patent and that said Letters Patent is hereby corrected as shown below:

On The Title Page, Item (30), Foreign Application Priority Data, change "2008 10117183" to --2008 10117183.x--;

In The Specification

Column 2, line 23, change "an LLTO" to --a LLTO--;

Column 2, line 46, change "mass of an Si" to --mass of a Si--;

Column 2, line 55, change "includes an Si" to --includes a Si--;

Column 2, line 56, change "an Li ion" to --a Li ion--;

Column 2, line 63, change "synthesizing an" to --synthesizing a--;

Column 2, line 67, change "is fanned into" to --s formed into--;

Column 3, line 41, change "to farm a sheet" to --to form a sheet--;

Column 4, line 7, change "an LLTO composite" to --a LLTO composite--;

Column 4, line 58, change "contain an li ion" to --contain a li ion--;

Column 6, line 1, change "(IEM)" to --(TEM)--;

Column 9, line 43, change "reaches 0.59 × 5cm," to --reaches $0.59 \times 10^{-4}$ S/cm--;

Column 13, line 50, change "0.89 S/cm" to --$0.89 \times 10^{-4}$ S/cm--;

Column 14, line 42, change "0.59 S/cm" to --$0.59 \times 10^{-4}$ S/cm--.

Signed and Sealed this
Seventeenth Day of March, 2015

Michelle K. Lee
*Director of the United States Patent and Trademark Office*